United States Patent
Holz (10) Patent No.: US 10,867,149 B2
(45) Date of Patent: *Dec. 15, 2020

(54) USER IDENTIFICATION THROUGH AN EXTERNAL DEVICE ON A PER TOUCH BASIS ON TOUCH SENSITIVE DEVICES

(71) Applicant: Yahoo Holdings, Inc., Sunnyvale, CA (US)

(72) Inventor: Christian Holz, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,377

(22) Filed: Sep. 10, 2015

(65) Prior Publication Data

US 2016/0004898 A1 Jan. 7, 2016

Related U.S. Application Data

(63) Continuation-in-part of application No. 14/303,493, filed on Jun. 12, 2014, now Pat. No. 9,396,378.

(51) Int. Cl.
*G06K 9/00* (2006.01)
*G06F 3/041* (2006.01)
(Continued)

(52) U.S. Cl.
CPC ..... *G06K 9/00013* (2013.01); *G06F 3/03545* (2013.01); *G06F 3/044* (2013.01);
(Continued)

(58) Field of Classification Search
CPC ........... G06K 9/00013; G06K 9/00087; G06K 9/003689; G06K 9/6201; G06F 3/0416; G06F 21/32; G06F 3/03545; G06F 3/044
See application file for complete search history.

(56) References Cited

U.S. PATENT DOCUMENTS 6,219,793 B1 * 4/2001 Li .................... B60R 25/2018
726/19
9,489,502 B2 * 11/2016 Davis .................. G06F 21/32
(Continued)

FOREIGN PATENT DOCUMENTS

GB 2 306 725 A 5/1997
GB 2306725 A 5/1997
(Continued)

OTHER PUBLICATIONS

Taiwan Intellectual Property Office, "Office Action" in application on. 105121884, dated Jan. 17, 2017, 8 pages.
(Continued)

*Primary Examiner* — Peter D McLoone
(74) *Attorney, Agent, or Firm* — Pillsbury Winthrop Shaw Pittman LLP (57) ABSTRACT

Techniques for communicating particular information from a user, using a sensing device, to a touch device by way of a touch event is provided. Sensors that are operatively coupled to a sensing device sense an input from the user which conveys particular information. This input is then converted by the sensing device into another signal that is then transmitted from the sensing device to the touch device. When the user uses the sensing device to interact with the touch device, the interaction causes a touch event on the touch device. A touch event occurs when the sensors within the touch device receive a touch-signal from the sensing device. The touch-signal is based, at least in part, on detected biometric information of the user. The touch device then decodes the touch-signal to both (a) determine the location of the touch event on the touch device and (b) obtain the sensing device signal embedded in the touch signal to extract the particular information related to the user.

26 Claims, 7 Drawing Sheets

(51) Int. Cl.
  *G06F 21/32* (2013.01)
  *G06F 3/044* (2006.01)
  *G06F 3/0354* (2013.01)
  *G06K 9/62* (2006.01)

(52) U.S. Cl.
  CPC ............ *G06F 3/0416* (2013.01); *G06F 21/32* (2013.01); *G06K 9/00087* (2013.01); *G06K 9/00369* (2013.01); *G06K 9/00885* (2013.01); *G06K 9/6201* (2013.01)

(56) References Cited

U.S. PATENT DOCUMENTS

| | | |
|---|---|---|
| 2008/0078590 A1 | 4/2008 | Sequine |
| 2009/0085877 A1 | 4/2009 | Chang et al. |
| 2010/0277435 A1 | 11/2010 | Han |
| 2012/0242603 A1* | 9/2012 | Engelhardt ......... G06F 3/03545 345/173 |
| 2012/0278031 A1 | 11/2012 | Oda et al. |
| 2013/0106725 A1* | 5/2013 | Bakken ................ G06F 3/033 345/173 |
| 2013/0181953 A1 | 7/2013 | Hinckley et al. |
| 2013/0318584 A1* | 11/2013 | Narayanan ............. G06F 21/50 726/7 |
| 2014/0028634 A1 | 1/2014 | Krah et al. |
| 2014/0168176 A1* | 6/2014 | Nowatzyk ........... G06F 3/03545 345/179 |
| 2015/0035643 A1 | 2/2015 | Kursen |
| 2015/0135108 A1* | 5/2015 | Pope .................. G06K 9/00006 715/767 |
| 2015/0220714 A1* | 8/2015 | Davis ..................... G06F 21/32 705/325 |
| 2015/0363631 A1 | 12/2015 | Holz et al. |

FOREIGN PATENT DOCUMENTS

| | | |
|---|---|---|
| TW | I3122554 B | 7/2009 |
| TW | 201346654 A | 11/2013 |

OTHER PUBLICATIONS

Taiwan Claims in application No. 105121884, dated Jan. 2017, 3 pages.
U.S. Appl. No. 14/303,493, filed Jun. 12, 2014, Final Office Action, dated Oct. 20, 2015.
International Search Report and Written Opinion dated Mar. 22, 2018 in International Application PCT/US2016/039555.
Office Action dated May 8, 2019 in U.S. Appl. No. 15/195,738.
Extended European Search Report dated Mar. 25, 2019 in European Application 16844832.2.
Office Action dated Aug. 22, 2019 in U.S. Appl. No. 15/195,738.
Office Action dated Jan. 17, 2020 in U.S. Appl. No. 15/195,738.
U.S. Appl. No. 14/303,493, filed Jun. 12, 2014, Advisory Action, dated Feb. 9, 2016.
U.S. Appl. No. 14/303,493, filed Jun. 12, 2014, Notice of Allowance, dated Mar. 15, 2016.
Holz et al., "Fiberio: A Touchscreen that Senses Fingerprints", UIST, AMC, dated 2013, 10 pages.
Office Action dated Jul. 6, 2020 in Taiwanese Patent Application No. 105121884.
Notice of Allowance dated Jul. 8, 2020 in U.S. Appl. No. 15/195,738.
Office Action dated Sep. 25, 2020 in EP Application No. 16844832.2.
Notice of Allowance dated Aug. 24, 2020 in U.S. Appl. No. 15/195,738.

* cited by examiner

FIG. 5

USER IDENTIFICATION THROUGH AN EXTERNAL DEVICE ON A PER TOUCH BASIS ON TOUCH SENSITIVE DEVICES

CROSS-REFERENCE TO RELATED APPLICATIONS; BENEFIT CLAIM

This application is a Continuation-in-part of U.S. patent application Ser. No. 14/303,493, filed Jun. 12, 2014, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present disclosure relates to conveying particular user-related information to a touch sensitive device by way of a touch event. More specifically, using an external device to convey particular user-related information to a touch sensitive device by way of a touch event.

BACKGROUND

Touch screen technology has revolutionized digital devices such as smartphones and tablets to become more and more capable of handling everyday computing. Currently, consumers are able to perform tasks such as email, web browsing, word processing, and internet banking through a touch screen device and without the need of a traditional computer.

Current touch screen devices send the two-dimensional coordinates of a touch event to the device's operating system. A touch event occurs when the touch screen senses the proximity of some conductive object, for example a finger or a stylus, which is within certain distance of one or more node sensors attached to the touch screen. The finger's capacitance interferes with the capacitance measured at the node sensor. Similarly, devices such as a stylus are used to interfere with the capacitance at a given node sensor. The node sensor picks up a change in the measured capacitance, which shows up as a salient spike in capacitance on that particular node sensor. Touch screen node sensors are designed to forward capacitance values to a touch screen controller. Touch screen controllers are configured to forward the two-dimensional coordinates of the touch event when the salient spike exceeds some predetermined threshold.

Specifically, once the predetermined threshold is exceeded, the touch screen controller interpolates the touch position of the touch event and then sends the two-dimensional coordinates (e.g. X, Y coordinates) to the operating system on the device. The operating system then maps the two-dimensional coordinates from the touch screen controller to the two-dimensional coordinate space of the operating system to figure out whether the touch event falls onto a displayed control in order to trigger some action.

Current touch screen technology requires a two-step process for authentication and user touch inputs. The first step being some user-authentication to unlock the device or authorize the action. The second step being the subsequent user touch inputs that perform the desired action on the device. For example, traditional means of accessing a secured device involve the input of a user-ID and password. This method of authentication assumes that after the user-ID and password have been successfully entered, the authorized user performs the subsequent actions. However, this is susceptible to unauthorized access because a hijacker could simply steal or acquire the user-ID and password and then enter the stolen user-ID and password to gain access to the device. The device will still assume that the person performing the subsequent actions is the authorized user. Alternatively, the hijacker could simply steal the device after the authorized user has entered the password.

Current methods of authentication to combat the stolen user-ID and password scenario include techniques such as fingerprint scanning. Where a fingerprint scanner is embedded into the device, such as the current iPhone™ home button, so that the user is required to unlock the device using his unique fingerprint before performing subsequent touch events. However, this technique is still an indirect means of authentication. Hijackers may not be able to steal your fingerprint but, they may be able to acquire the device after it has been authenticated by an authorized user. Once authenticated and unlocked, the device still assumes that the subsequent touch events are performed by an authorized user, not the hijacker.

Other techniques may use technologies such as, Bluetooth or near field communication, to continually authenticate that the user is within the immediate vicinity. However, this implements the same two-step approach to authentication where the communication point between the Bluetooth device and the touch device is susceptible to hijacking. Once hijacked, the touch device will still assume that the authorized user is performing subsequent touch events.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In order to overcome the vulnerabilities of the two-step method of authentication and subsequent user inputs, techniques are provided in which authentication is performed within the touch event itself. Specifically, methods, non-transitory computer-readable media, and systems are provided for communicating particular information from a user to a touch device by way of a touch event.

According to an embodiment, a sensing device, separate from the touch device, detects input which conveys particular information. The nature of the input detected by the sensing device may vary from implementation to implementation, based on the type of sensors used by the sensing device. In an embodiment, the particular information detected by the sensor includes biometric information that is unique to the user.

The input detected from the user is then converted by the sensing device into another signal that is then transmitted from the sensing device to the touch device. When the user uses the sensing device to interact with the touch device, the interaction causes a touch event on the touch device. A touch event occurs when the sensors within the touch device receive a touch-signal from the sensing device. The touch-signal is based, at least in part, on detected biometric information of the user. The touch device then decodes the touch-signal to both (a) determine the location of the touch event on the touch device and (b) obtain the sensing device signal embedded in the touch signal to extract the particular information related to the user.

This method of directly transferring particular data that is unique to the user will eliminate the need of a two-step process of authentication and subsequent touch events. By embedding user specific data into the touch signal itself, the user is able to convey his identity along with the coordinates of the touch event.

The Sensing Device

Figure 1:
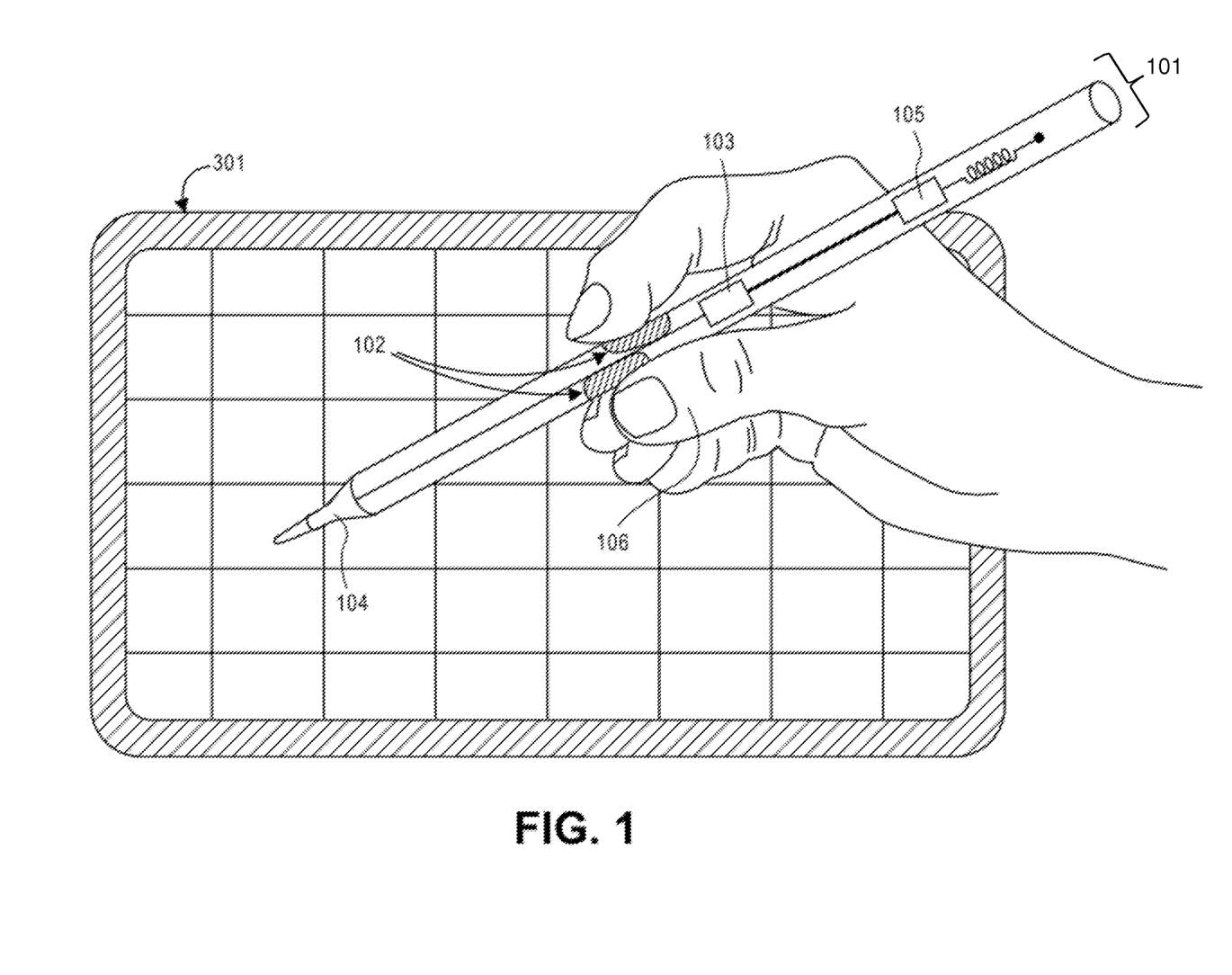
FIG. 1 illustrates a system diagram of a sensing device.

FIG. 1 is a diagram that illustrates a sensing device 101 that may be used to perform the on-the-fly authentication techniques described herein. Sensing device 101 may take the form of a stylus and may position a transmitting unit 104 in the tip of the stylus that usually makes contact with a touch device.

Other embodiments of the sensing device 101 include, but are not limited to, handheld devices or wearable devices such as gloves, rings, or a thimble. The transmitting unit 104 would be strategically placed so that it comes into direct contact with the touch device during a touch event. For example, if the sensing device 101 is a ring, then the transmitting unit 104 is positioned on the head of the ring. If the sensing device 101 is a glove, then the transmitting unit 104 is positioned or configured to transmit through the fingertips of the glove.

As shall be described hereafter in greater detail, sensing device includes sensors 102. The nature of the sensors 102 used by sensing unit 101 will vary based on the type of information that is to be conveyed to the touch device. For example, if the information is bioimpedance information, then sensing device sensors 102 within the sensing device 101 would be specialized sensors designed to detect bioimpedance based upon the contact with the user's skin. If however, the information to be conveyed is a retinal scan of the user, then the sensing device sensors 102 would be a specialized camera configured to detect and read the user's retina.

Yet other embodiments of the sensing unit 101 may include, but are not limited to, input devices such as keyboards, joysticks, trackballs, mice, and trackpads. These devices may be connected to a touch device or other computer and may detect particular information from the user, using sensing device sensors 102, and transmit that information to the touch device along with the user's requested device input. For example, if the sensing unit 101 were a specialized keyboard, then in one embodiment the sensing device sensors 102 would be placed on the keys of the keyboard to detect a user's biometric information. After the biometric information is collected, a processing unit 103 would convert the biometric information into binary code, which then would be transmitted to the touch device along with the key input depressed by the user. Similarly, if the sensing device 101 were a mouse or a trackball device, then the sensing unit sensors 102 would be positioned on the mouse buttons of the outer housing of the mouse.

Sensing User-Specific Data

FIG. 1 illustrates an embodiment of a sensing device 101 used to detect information from the user. The sensing device 101 includes sensors 102 that detect particular information related to the user, for the purpose of conveying the information to a processing unit 103 contained within the sensing device 101.

The information detected by sensors 102 may include, but is not limited to, biometric information about the user. Biometric information is a measureable biological characteristic to identify an individual. Biometric information that is useful for determining a user's identity requires that the biometric information be easily measureable in all individuals, unique to each individual, and a permanent characteristic that does not change over time. Biometric information for determining a user's identification include, but are not limited to, bioimpedance within a finger, hand, or wrist, electrocardiogram (ECG), retina scan, iris scan, DNA matching, and vein patterns of the finger or palm.

In an embodiment, the information detected by the sensing device 101 from the user is the user's bioimpedance. Bioimpedance refers to the electrical properties of biological tissue when current flows through it. Bioimpedance varies from person to person, depending on an individual's particular density of bone, blood vessels, and flesh.

In an embodiment that detects bioimpedance, the sensing device 101 uses sensing device sensors 102 coupled to the sensing device 101 to detect bioimpedance when the user touches the sensing device 101. In an embodiment, the sensing device sensors 102 are strategically placed on the sensing device 101 so that the sensing device sensors 102 come into contact with the user's skin 106, for instance the tip of the user's finger. Once in contact with the user's skin 106, the sensing device sensors 102 detect the bioimpedance from the user. In one embodiment, the sensing device sensors 102 are continually detecting biometric information.

In another embodiment, the sensing device sensors 102, which are coupled to the sensing device 101, may include a camera that scans the user's retina and/or iris for scanning uniquely identifiable biometric information. Other embodiments may also include sensing device sensors 102 that detect vein pattern recognition of a user's finger or palm.

Generating an Identifier-Signal

The processing unit 103 is operatively coupled to the sensing device 101. In one embodiment the processing unit 103 is configured to receive the input detected by the sensing device sensors 102 and convert the input, for instance the biometric information from the user, into a signal that is referred to herein as an "identifier-signal". An identifier signal is a signal that encodes the particular information detected from the user. As shall be described in greater detail hereafter, the identifier-signal is generated in a form that is capable of being transmitted from the sensing device 101 to another device.

Figure 3A:
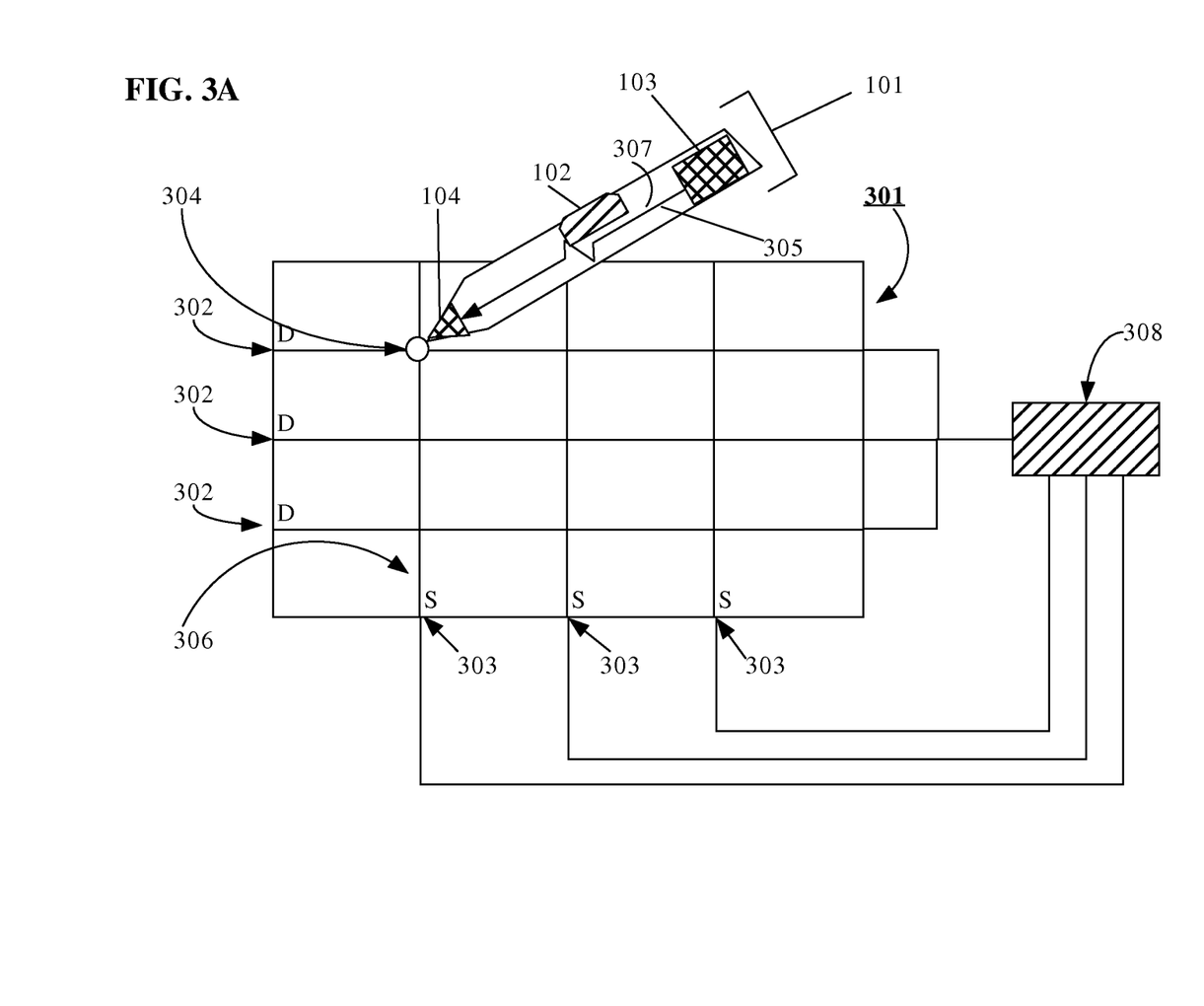
FIG. 3A illustrates a diagram of the touch device receiving a signal from the sensing device.

Referring to FIG. 3A, it illustrates sensing device 101 in which the processing unit 103 is converting the input from device sensors 102 into an identifier-signal 305. Embodiments of the identifier-signal 305 include, but are not limited to, a modulating alternating current (AC) at a high frequency. For example, the identifier-signal 305 is the converted biometric information modulated onto an AC signal at a frequency of 2000 Hertz. Other embodiments of the identifier-signal 305 may encode the detected information in other ways, such as by varying the frequency of the AC signal.

In other embodiments, processing unit 103 receives the detected biometric information sensed from the sensing device sensors 102, converts the biometric information into a digital bitstream, adds additional information related to the user or the sensing device to the digital bitstream, and then converts the digital bitstream into the identifier-signal 305. The additional information added by processing unit 103 to the biometric information may include, for example, personal data related to the user, location information related to the user, or personal preferences set by the user.

With respect to information related to the sensing device 101, such information may include, but is not limited to, the type of sensing device 101 such as, whether the device is a stylus, a glove, a ring, or some other specialized sensing device 101. Additional information can also include whether the sensing device 101 is configured to display a specific color. For example, if the sensing device 101 is a stylus and is being used on a touch device 301, such as a large multi-touch device, then it would be useful to have multiple sensing devices where each sensing device 101 designates a different color on the multi-touch device. In this scenario, the touch signal 305 will convey the biometric information of the user using the sensing device 101, the type of sensing device 101, and the color that the particular sensing 101 is configured to display on the multi-touch device. Alternatively, a single sensing device may have a control for selecting a color. The color that is currently selected is reflected in the digital bitstream. By selecting a different color using the control, the user causes the information conveyed in the digital bitstream to change to reflect the newly selected color.

Transmitting the Identifier-Signal

According to one embodiment, sensing device 101 includes a touch-based transmitting unit 104 that sends the identifier-signal 305 produced by the processing unit 103 to a touch device during a touch event. In an embodiment, the transmitting unit 104 transmits the identifier-signal 305 in the form of a modulated AC signal that contains the user's biometric information encoded as binary code. In an embodiment, the transmitting unit 104 is positioned on the sensing device 101 so that the transmitting unit 104 comes into close enough proximity with the touch device to transfer the identifier-signal 305 to the touch device during a touch event. For example, if the sensing device 101 is a stylus, then the transmitting unit 104 is positioned at or near the tip of the stylus.

In an embodiment, the sensing device 101 is configured to continually detect the user input by the sensing device sensors 102, continually convert the detected input into an identifier-signal 305 by the processing unit 103, and continually transmit the identifier-signal 305 by the transmitting unit 104. In an embodiment, the sensing device 101 is configured not to store any biometric data of the user, so that when the user is not in contact with the sensing device 101, the sensing device 101 would cease to transmit particular information related to that user. This feature is advantageous as a security measure because it prevents an unauthorized user from stealing the sensing device 101 and using it to trick the touch device into giving the unauthorized user access to the same functionality and information that is available to the user.

Additionally, this feature allows multiple users to use the same sensing device 101 to convey their own particular information to a touch device. For example, if two users are collaboratively working on the same touch device, then each user may use the same sensing device 101. The touch device is able to discern inputs from each user because every time a user uses the sensing device 101 to interact with the touch device, the sensing device 101 conveys particular information that is unique to the user who is holding the sensing device at that time. Therefore the sensing device 101 is acting as a proxy to convey each user's particular information to the touch device when each user interacts with the touch device.

Example On-The-Fly Authentication Operation

Figure 2:
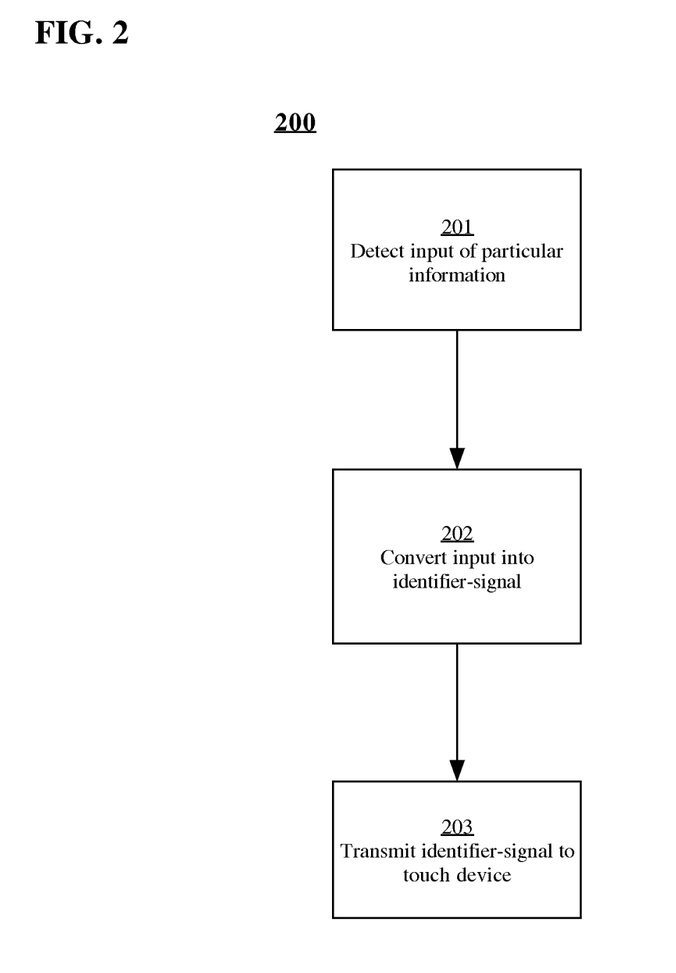
FIG. 2 illustrates a flow diagram of a method implemented by the sensing device.

FIG. 2 is a flow diagram that depicts a process 200 for performing on-the-fly authentication as a user is performing operations on a touch device. At block 201, an input that conveys particular information unique to the user is detected using the sensing device sensors 102. As discussed, the particular information may include biometric information of the user. In an embodiment, the sensing device sensors 102 may be configured to continuously search for user-specific biometric information, regardless of whether a user is currently interacting with the sensing device. In another embodiment, the block 201 may be triggered when the user holds the sensing device 101. For example, if the sensing device is resting on a desk then the sensing device 101 is not actively searching for user-specific biometric information. However, once the user picks up the sensing device 101, the sensing device 101 detects a human hand and the sensing device sensors 102 begin to actively search for user-specific biometric information. In an embodiment, the sensing device sensors 102 are configured with an active mode and an inactive mode, where the active mode represents a state where the sensing device sensors are actively detecting user-specific biometric information (block 201).

At block 202, the input is converted to an identifier-signal 305 by the processing unit 103. In an embodiment, the processing unit is configured to immediately process incoming signals from the sensing device sensors without storing the incoming signal. This ensures that the step of converting an incoming signal into an identifier-signal 305 (block 202) is linked to the prior step (block 201). The security benefit of not storing previously detected user-specific biometric information is that it ensures that identifier-signals 305 created by the sensing device 101 are linked to the user who is currently interacting with the sensing device 101.

For example, if user A is interacting with the sensing device, then at block 201 the sensing device sensors 102 will detect user A's biometric information and convey it to the processing unit 103. At block 202, the processing unit 103 will immediately receive a signal from the sensing device sensors 102 that conveys biometric information for user A.

If user A lets go of the sensing device 101, then the sensing device sensors 102 would stop detecting biometric information for user A and the processing unit 103 would stop converting the biometric information signal into an identifier-signal 305. If by chance an unauthorized user, user B, tries to quickly pick up the sensing device 101, hoping to gain unauthorized access using user A's identifier-signal 305, user B would be denied because once user B interacts with the sensing device 101, the sensing device sensors 102 (block 201) would detect user B and relay the biometric signal associated with user B to the processing unit 103.

At block 203, the transmitting unit 104 relays the identifier-signal 305 from the sensing device 101 to a touch device when the user interacts with the sensing device 101. For example, when user A uses the sensing device 101 to interact with a touch device, the transmitting unit 104 sends the identifier-signal 305, created by the processing unit 103, to the touch device as an AC signal that is transmitted from the tip of the sensing device 101 to the touch device screen. In an embodiment, the transmitting unit 104 is configured immediately transmit identifier-signals 305 from the processing unit 103 to the tip of the sensing device 101, where the tip of the sensing device 101 is the portion of the sensing device 101 that directly interacts with the touch device. In other embodiments of the sensing device 101, the transmitting unit 104 may relay the identifier-signal 305 to the portion of the sensing device 101 that interacts with the touch device. For example, if the sensing device 101 is a glove, then the transmitting unit 104 is configured to relay the identifier-signal 305 to the fabric located on the fingertips of the glove. In another example, if the sensing device 101 is a ring, then the transmitting unit 104 is configured to relay the identifier signal 305 to the crown of the ring, where the crown of the ring is the portion that interacts with the touch device.

Receiving the Signal by Touchscreen

Referring again to FIG. 3A, in addition to sensing device 101, it illustrates a capacitive touch device 301 with touch sensors. The touch device 301 includes drive lines 302 along one particular axis (X-axis), which are used to carry current across the particular axis, and sense lines 303 along the other axis (Y-axis), which are used to detect the voltage at each particular sensor node, such as the target node 304. The capacitance across a particular sensor node is calculated as the current divided by the rate of change in voltage across that sensor node. When no external object is in close proximity with the sensor node, the value of capacitance gives a relative baseline for the level of capacitance when no touch event occurs.

A user uses the sensing device 101 to send a touch-signal 307 to the capacitive touch device 301 when he places the sensing device in close proximity to the sensor nodes on the capacitive touch device 301. A portion of sensing device 101 is designed with conductive material so that when the sensing device 101 is in close proximity to the capacitive touch device 301 it causes interference with the capacitive field across the target node 304. The target node 304 reads the rate of change in the voltage to determine capacitance. When the rate of change in the voltage decreases, the target node 304 interprets this decreased rate of change in voltage as a spike in capacitance 315. All of the sensor nodes, including the target node 304 report their capacitance data to a sensor controller 308. The sensor controller 308 then determines whether the spike in capacitance 315 at a particular node qualifies as a touch event.

FIGS. 3B-3E illustrate a spike in capacitance 315 from the touch-signal 307 that exceeds a set threshold 320 for a touch event. The set threshold 320 of capacitance is set by the manufacturer in order to ensure that only real touch events by the user are interpreted as touch events and slight changes in capacitance due to outside factors creating noise are not interpreted as touch events. Once the sensor controller 308 identifies a touch event, the sensor controller 308 interpolates the 2D coordinates of the touch event.

The transmitting unit 104 transmits the identifier-signal 305 to the conductive area of the sensing unit 101 so that when the user sends a touch-signal 307 to the touch device 301, the identifier-signal 305 is sent as part of the touch-signal 307. This occurs because the identifier-signal 305, which is a modulated AC signal, is transferred to the capacitive field during the sending of touch-signal 307. When the user sends a touch-signal 307 to the target node 304, the modulated AC signal is also received at target node 304 of target sense line 306. The level of voltage emitted by the identifier-signal 305 is sufficient enough to clearly differentiate between the measured capacitance with the identifier-signal 305 applied and the measured capacitance without the identifier-signal 305 applied. The effect of the identifier-signal 305 to the target node 304 is illustrated in FIGS. 3B-3E.

Figure 3B:
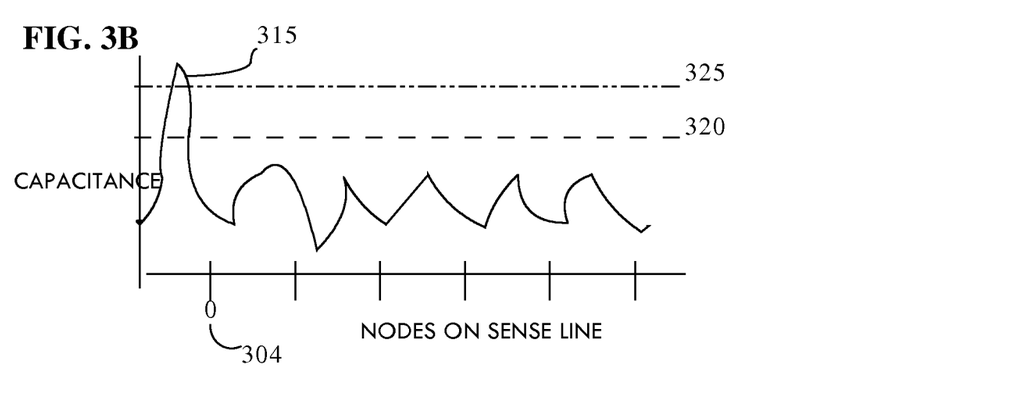
FIGS. 3B-3E illustrate graphs depicting measured capacitance a node on a particular sense line.

FIGS. 3B-3E show the measured capacitance at target node 304 over successive time periods for a single touch event. During this time period, different bits of the binary code that make up the identifier-signal 305 are transmitted to the touch device 301 as part of the touch-signal 307. Each graph in FIGS. 3B-3E represents a single time period of the entire touch event where a single bit of the binary code is transmitted to the touch device 301. In each graph the X-axis in represents the measured nodes on the target sense line 306 and the Y-axis represents the measured capacitive values at each of those measured nodes. FIG. 3B graph shows spike in capacitance 315 at target node 304 at a specific time 0, where time 0 signifies the beginning of a touch event. The spike in capacitance 315 depicts a change in capacitance when the conductive region of the sensing device 101 is in close proximity to target node 304 of the touch device 301.

Figure 3C:
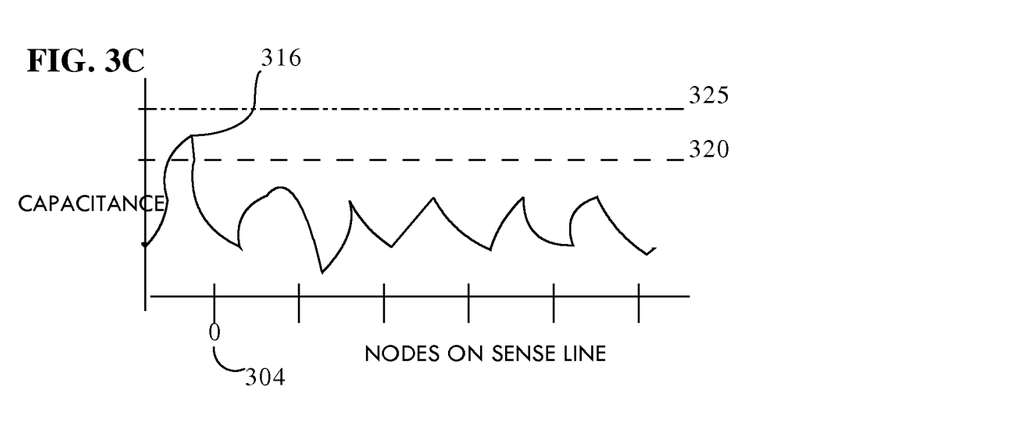
Figure 3D:
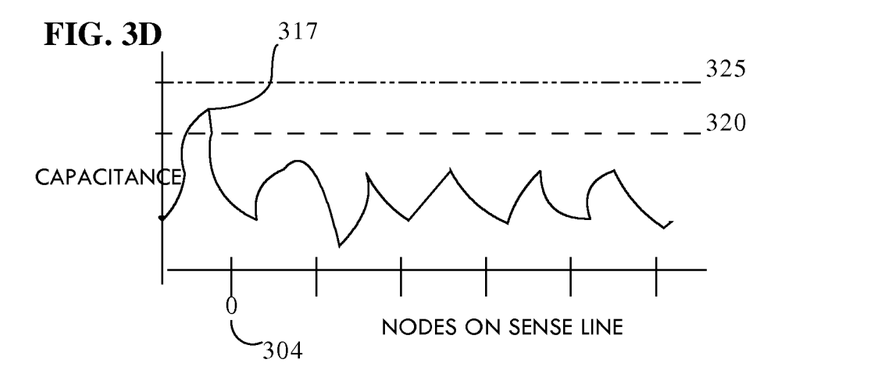
Figure 3E:
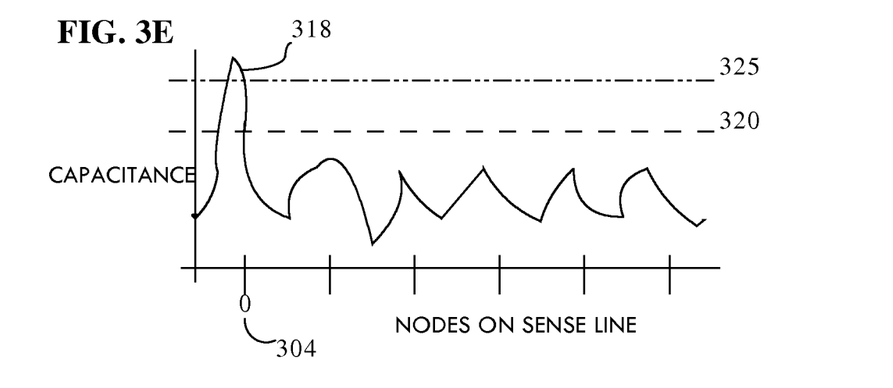

Since the identifier-signal 305 is a modulated AC signal, which, modulates over a specified frequency, the sensor controller 308 is able to interpret from the node sensor capacitance data different bits of a binary sequence sent as the identifier-signal 305. As shown in in FIG. 3B, the spike in capacitance 315 exceeds the set threshold 320 for a touch event and also exceeds a set binary threshold 325. In an embodiment, the sensor controller 308 uses the binary threshold 325 to determine incoming binary code. If an incoming spike in capacitance is a registered touch event and exceeds the binary threshold 325, then the sensor controller 308 assigns a value of 1. If an incoming spike in capacitance is a registered touch event and it does not exceed the binary threshold 325, then the sensor controller 308 assigns a value of 0. FIG. 3B depicts a time event 0 where the spike in capacitance 315 exceeds the binary threshold 325; therefore it is assigned a value of 1 for time event 0. FIG. 3C depicts time event 1 where the spike in capacitance 316 does not exceed the binary threshold 325 and is assigned a value of 0 for time event 1. FIG. 3D depicts time event 2 where the spike in capacitance 317 does not exceed the binary threshold 325 and is assigned a value of 0 for time event 2. FIG. 3E depicts time event 3 where the spike in capacitance 318 exceeds the binary threshold 325 and is assigned a value of 1 for time event 3. The sensor controller 308 then compiles the values from successive time periods into a binary sequence This decoded binary sequence represents the originally detected input by the sensing device 101 which was then converted into the identifier-signal 305 and then transmitted with the touch-signal 307.

Other embodiments include, but are not limited to, encoding multiple signals in the identifier-signal 305 based on different frequencies. The sensor controller 308 can be programmed to decode the identifier-signal 305 and multiple frequencies in order to compile multiple sets of binary sequences during the touch event time interval.

In another embodiment, the touch device 301 is able to differentiate between simultaneous touch-signals. The sensor controller 308 is then able to decode separate and distinct touch-signals into separate binary sequences. Then the sensor controller 308 is able to associate those separate binary sequences to their corresponding location-signals.

Once the sensor controller 308 decodes the binary sequence, the sensor controller 308 sends: the interpolated 2D coordinates of the touch event associated with the touch-signal 307, and the decoded binary sequence to the operating system. In an embodiment, the operating system may map the interpolated 2D coordinates of the touch event to the 2D coordinate space of the operating system to determine whether or not a button was pressed. Then the operating system may use the decoded binary sequence from the user to determine whether or not the user is authorized to perform the action associated with the corresponding pressed button.

Figure 4:
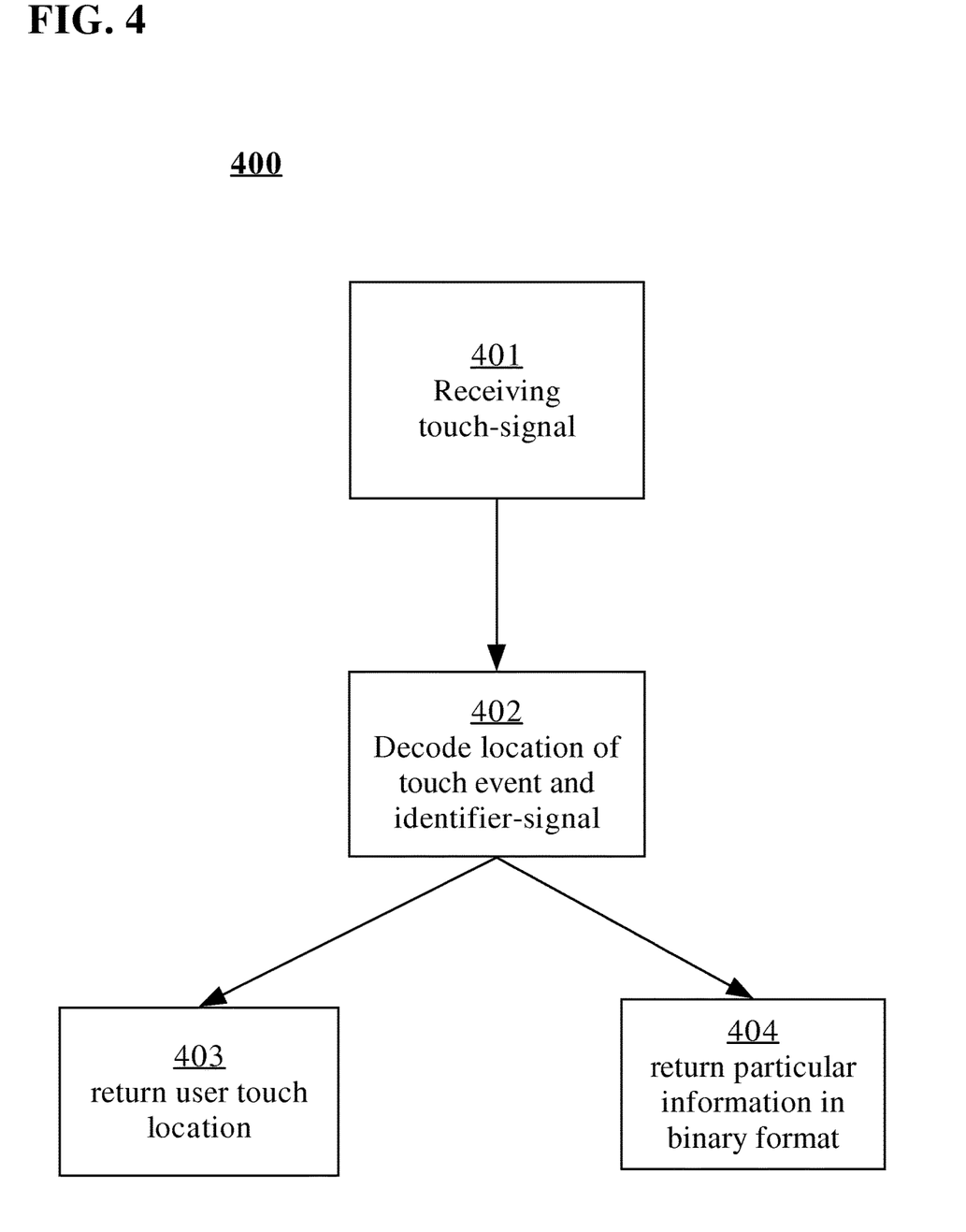
FIG. 4 illustrates a flow diagram of a method implemented by the touch device to receive and decode a signal from a touch event.

FIG. 4 is a flow diagram that depicts a process 400 for receiving a touch-signal 307, decoding the touch-signal 307 to extract and determine the 2D coordinates associated with the touch event, and decoding the identifier-signal 305 within the touch-signal 307 to determine the binary sequence representing the particular information from the user. In step 401, the touch device 301 receives a touch-signal 307 from the user. The touch-signal 307 may trigger a touch event at the particular target node 304 and include the identifier-signal 305. At step 402 the touch-signal 307 is then decoded by the sensor controller 308. The decoding step 402 includes determining the 2D coordinates of the touch-signal 307 on the touch device 301 where the spike in capacitance 315 exceeds the set threshold 320 to qualify as a touch event. Output 403 represents the touch event and its interpolated 2D coordinates. Step 402 also decodes from the touch-signal 307 the identifier-signal 305 to determine the binary sequence that represents the particular information from the user. Output 404 represents the particular information conveyed from the user in a binary format.

Devices Other than a Touch Device

Embodiments have been previously discussed in terms of a touchscreen as the input device. Other embodiments of the input device may include a computing device other than a touch device. Embodiments of a computing device may include, but are not limited to, a computer with a connected keyboard, mouse, or other accessory designed to convey user interaction.

In the context of a touchscreen user interaction was described as a touch event, where the touch screen receives input from a user to perform a specified action. User interactions where the sensing device is a keyboard and the input device is a connected computer may be defined as a single keystroke on the keyboard. In an embodiment, if the sensing device were a keyboard then the sensors would be affixed to each key on the keyboard so as to sense the user's biometric information at the time the user depresses a key.

Since each keystroke is defined as a user interaction, the keyboard would send sensed biometric information from the user with the signal for the depressed key to the computer. By doing so, the computer is able to decode particular information (the user's biometric information) from the signal along with decoding which particular key was depressed. This allows the computer the ability to authenticate each inputted keystroke to determine whether the user has permission to input that keystroke at that time. For example, if user A was typing an email using the sensing device keyboard and user A stepped away for a moment, unauthorized user B would not be able to type on the same email because each keystroke inputted by user B would be authenticated before allowing the user B input to be entered and displayed on user A's email on the computer.

In another example sensing device may be a mouse where the input device is a computer connected to the mouse. The sensors on the mouse may be strategically placed so as to capture the user's biometric information when the user navigates the mouse or depresses one of the mouse keys. The mouse would then send a location signal plus the user's sensed biometric information, or a depressed mouse button signal plus the user's sensed biometric information when the mouse button was pressed. As discussed in previous examples the input computer device would then decode the user's biometric information along with the mouse location or mouse button information and determine whether the user has authority to perform the requested user action.

Other examples include the sensing device as an accessory such as, a stylus pen with a trackpad, a head mounted device with a camera, a joystick, or a game controller. In each of these examples the accessory is configured with a biometric sensors to sense the user's biometric information when a user interaction occurs. The accessory then sends the biometric information to the computer along with the user interaction input for the computer to decode and determine whether the user has permission to perform the requested action.

Wireless Transmission of the Identifier-Signal

According to one embodiment, in addition to the having touch-based transmitting unit 104, sensing device 101 includes a wireless transmitting unit 105 for the purpose of transmitting extra information to the touch device. In one embodiment, the wireless transmitting unit 105 uses a wireless protocol, such as Bluetooth, to transmit data directly to the touch device. The wireless transmitting unit 105, in conjunction with the transmitting unit 104, is used to transmit particular information related to the user in the form of encrypted data. Encrypted data provides a higher level of security for transmitted data where only authorized recipients who have a decryption key are able to decrypt and use the encrypted data. In an embodiment, the wireless transmitting unit 105 sends encrypted biometric information to the touch device. The transmitting unit 104 is used to send the decryption key to the touch device so that the touch device is able to read the encrypted data sent via the wireless transmitting unit 105. In another embodiment, the transmitting unit 104 is used to send the encrypted biometric information to the touch device and the wireless transmitting unit 105 is used to send the decryption key to the touch device.

In another embodiment, the wireless transmitting unit 105 may be used to transmit other information specific to the user, such as user preferences, to the touch device. In an embodiment, the user may configure the sensing device 101 to wirelessly transmit, via the wireless transmitting unit 105, information that may configure the user experience on the touch device 301. For example, a user using a new touch device may use the sensing device 101 to wirelessly transfer the user's preferences to the new touch device when the user first interacts with the touch device.

In another embodiment, the wireless transmitting unit 105 may be used to transmit sensing device 101 specific information to the touch device. For example, if the sensing device 101 is configured represent a specific color such as red, then when the sensing device 101 interacts with the touch device, the sensing device 101 uses the wireless transmitting unit 105 to transmit the configured color to the touch device. The end result that when the user interacts with the touch device, the sensing device 101 sends user-specific biometric information to the touch device via the transmitting unit 104 and simultaneously sends the configured "red" color to the touch device via the wireless transmitting unit 105, which results in the user's input displayed in red on the touch device.

Concurrent Initiation and Authentication

Using the techniques described herein, the same input that specifies an operation is used to determine whether the operation being performed by an authorized user. For example, assume that user X is authorized to perform operations A and B, user Y is authorized to perform operation C, and user Z is not authorized to perform any operation. In response to detecting a touch event, the touch device determines what operation the touch event is configured to initiate (touch events initiate different operations based on the location of the touch events and the context in which the touch events occur). In addition to determining the operation, the touch device determines the identity of the user by mapping the biometric information conveyed in the touch event to a user-id. That user-id is then checked against the list of user-ids that are authorized to perform that operation. If the user-id that corresponds to the biometric information that matches a user-id that is authorized to perform the operation, then the operation is executed. For example, if the touch event initiates operation C, and the biometric information is that of user Y, then operation C is executed. On the other hand, if the biometric information does not match an authorized user for that operation, the operation is not performed. Instead, an error message may be generated. For example, if operation C attempted through a touch event by user X, then rather than perform operation C, the touch device may generate an error message.

Because the touch event signal serves the dual purpose of specifying an operation and identifying the user that is attempting to perform the operation, users that are authorized to perform different actions may simply pass the touch device between them without having one user log out to let another user log on. For example, user X can perform operation A (which user Y is not authorized to perform), and then pass the device to user Y. Without any logging in or out, user Y may then perform operation C (which user X is not authorized to perform). In sharing the touch device with user Y, user X need not fear that user Y would perform operation A, because any attempt to do so by user Y would be denied.

Concurrent Users

The techniques described herein may be used to detect which touch events, concurrently input on the same touch device, were performed by which users. For example, in a game environment, both user X and user Y may be concurrently performing touch events on the same touch screen. For each touch event, the touch device may determine the user that performed the touch event by the biometric information that is decoded from the touch event signal. Depending on who performed which touches, the game (or any other software) may perform differently.

Another example of discerning which touch events belong to which user is in a collaborative environment where multiple users may be simultaneously interacting with large multi-touch devices. For instance, if a large multi-touch device is being used as a whiteboard during a meeting. The users in the meeting may have available to them multiple sensing devices, where each sensing device is a stylus that is programmed to act as a different colored pen when applied to the whiteboard application. If user X, who is the team leader, picks up the "black" sensing device and draws a system layout for a project, then from these touch events, the multi-touch device determines that user X is using the "black" stylus and is drawing. The whiteboard application may be programmed so that inputs from a team leader, such as user X, are not allowed to be edited by others. When user Y, a junior member, picks up the same "black" sensing device and attempts modify user X's drawing, the whiteboard application will determine that the modification is coming from an unauthorized user and will reject the modification. Other examples of using multiple sensing devices on the whiteboard application can allow selective edits of certain colors (different sensing devices) by certain users. Additionally, the whiteboard application (or any other software) may be programmed to selectively display the inputs of certain users while removing inputs of other users. This implementation provides numerous advantages in collaborative meetings and whiteboard sessions.

User-Specific Operations

Rather than merely determine whether an operation is authorized, the biometric information conveyed in the touch event signal may affect how a requested operation is carried out. For example, if a touch-event initiates a "read email" operation, the email messages that are displayed to the user may be based on the biometric information conveyed by the signal that triggered the touch event. For example, if the biometric information matches user X, then the touch event causes the display of email messages from user X's inbox. On the other hand, if the biometric information matches user Y, then the touch event causes the display of email messages from user Y's inbox.

User specific operations within applications may be customized and enhanced based upon the user associated with the biometric information conveyed in the touch event signal. As an example, web browser applications are able to function without any user specific information but, can be customized and enhanced based on a user's browsing history, bookmarks, and other customizations. For instance, when user X initiates a touch-event that launches a web browser, the operating system can start or resume a web session in user X's context. This context may include, but is not limited to, loading respective cookies, resuming previous sessions to remote sites, and loading the user's bookmark folders. If user Y, initiates a touch-event to trigger a new webpage, then the web browser may launch a new webpage with user Y's cookies, previous session history, bookmark folders.

As another example, a user may use a touch screen to select a control to purchase an item. The touch event signal may be decoded to determine the identity of the user that selected that button. If that user is registered and has sufficient funds available, then the purchase may execute immediately. If the user is registered but does not have sufficient funds, then the user may be presented with prompts to indicate a means for paying. If the user is not registered, or not identified at all, then the user may be presented with prompts to create an account.

In yet another example, one user may perform transactions on behalf of another user. For example, if user X is using a bookstore application, then the bookstore may show recommendations based on user X's previous purchases. User X may then touch the 'buy' button for a specific book, which would charge user X's account. If user X has insufficient funds, then the bookstore application will not complete the purchase. However during the same session, user Y may touch the 'buy' button for user X. This touch event by user Y will inform the bookstore application that user Y is purchasing the book during user X's session. The bookstore application may prompt user Y with a dialogue box asking if user Y wants to purchase the book for user X. If user Y agrees, then the bookstore application will transfer the book to a shared library and complete the purchase by charging user Y's account.

In an example of sharing data between users involves one user temporarily granting access to another user. For example, if user X is using a photo library application to access photo albums, the photo library application will only allow user X to access albums that belong to user X. If user X were to select an album that belongs to user Y, then the photo application will deny permission to user X. However, if user Y wanted to share one of his albums with user X, user Y may do so temporarily. Sharing may be implemented where both user X and user Y touch the desired photo album simultaneously. The photo application will then recognize touch events from both user X and user Y, and because both users are touching the album wishing to be shared, the photo application will recognize that user Y (authorized user) as the "sharer" and user X (unauthorized user) as the "sharee". The photo application will then grant temporary access to the sharee, which in this case is user X. Alternative embodiments may implement sharing based upon different combinations of simultaneous or successive inputs from users. Shared access may be revoked either by exiting the application or based upon some other timeout feature.

Options to Protect Displayed Content

Restricting access to content based upon a user who initiated a touch event may also be implemented on non-user-initiated output, such as incoming notifications that are displayed on a touch device. The sensitivity of incoming events is closely related to the classification of access permissions. Touch devices display incoming notifications from applications, other than the foreground application, in the form of a pop-up notification. Touch devices, programmed with biometric touch event decoding, may be configured to display limited amounts of information in pop-up notifications based upon the access privileges from the application that initiates them.

For example, if an application that initiates a pop-up notification does not have any user-based restrictions or customizations then the pop-up notification will not be restricted based on which user the notification is targeting. If the notification originated from an application that does have user-based restrictions, then the message may be presented with limited information conveying that a notification exists.

Accessing certain pop-up notifications may be based on which user is initiating the touch event in response to the notification. For example, a notification may pop up on the touch screen indicating "new messages in Yahoo Messenger". This type of notification may be programmed not to show the comments themselves because they may be privileged for the intended recipient. Only the authorized user may initiate a touch event to reveal the details of the Yahoo messenger notification. Additionally, if multiple notifications exists for multiple users, then when user X initiates a touch event to reveal the details of the notifications, only the notification intended for user X are revealed. Details for notifications for user Y are only accessible by user Y.

After the details of a notification have been revealed by an authorized user, the details need to be removed from the touchscreen so that unauthorized users may not view them. In an embodiment, displaying the details of a notification are only displayed for the duration of the touch event. For example, if a notification of a message for user X pops up, then user X may display the details for the notification by initiating a touch event and those details are only visible for the time that user X touches the sensing device to the touch device. Once the user removes the sensing device, thereby ending the touch event, the details of the notification disappear from the touch device.

Another example of protecting displayed content is prompting the user with a highly confidential notification. A highly confidential notification is information that requires the user to take special action to keep it secure from nearby persons. For example, the user may need to use his free hand to cover the touch device so that he is the only person able to view the screen. In an embodiment, the notification system may require an authorized user to initiate a touch event, with a sensing device to convey his biometric information, and initiate a second touch event with the bottom of his free hand, which the touch device analyzes using shape analysis of the second touch event to determine that the authorized user's hand is covering the touch device display from nearby persons viewing the screen.

Explicit Logins for Custom Sections

Touch device interfaces may be customized based upon the biometric information related to a user. For example, a touch device initially displays a start screen or a lock screen that must be unlocked before the user can use the device. Unlocking the device may require a touch event from the user. During the touch event, the touch device may customize the home screen with custom backgrounds and applications that are related to the user that unlocked the touch device. A second user, after unlocking the device, may have a different home screen with his custom applications and background.

Similarly, logging into or launching highly secure documents such as, business transactions may require the presence of two authorized users. In this case, the touch device may only display the highly secure document if the touch device receives biometric information during touch events from both user X and user Y simultaneously. This may be advantageous for securing access to information that requires authorization from multiple users.

Operating System-Based Authorization

According to one embodiment, the techniques described herein may be used in a manner that involves the operating system in the authentication process. For example, rather than simply convey that a touch event occurred at a particular location on a touch screen, the operating system may convey to an application the event type, the screen location, and the identity of the user that performed the event. Based on this additional information, applications may perform authentication and/or initiate user-specific operations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
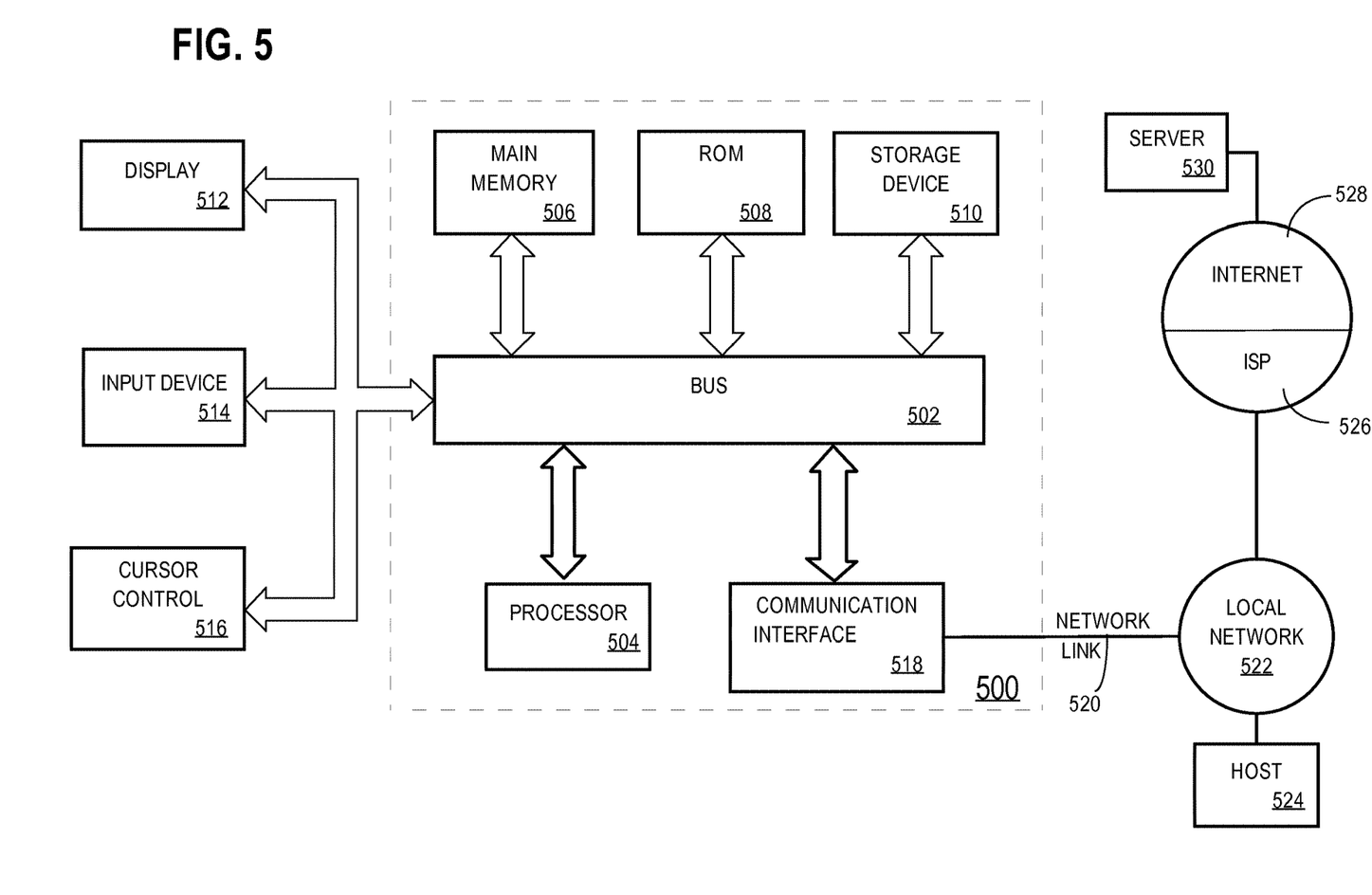
FIG. 5 illustrates an example computer system that may be specially configured to perform various techniques described herein.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Benefits of Certain Embodiments

In an embodiment, a solution as described herein improves security on a device which uses a touch screen for input. Current touch devices usually employ security measures to either unlock the device or to perform a specific action that requires authentication. Touch inputs are not authenticated directly. By incorporating the authentication step into the touch input itself, it eliminates the vulnerability of unauthorized touch event signals after a device has been unlocked or a user has been authenticated. Furthermore, this solution enhances the level of security for each touch input because each touch input is now authenticated against a set list of authorized users.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for transmitting information about a user to an input device, the method comprising:
    while the user is using a sensing device to interact with the input device for an intended operation, performing the steps of:
        using one or more sensors, within the sensing device, to detect biometric information of the user;
        converting, by a processing unit within the sensing device, the biometric information of the user into a first signal;
        encoding, by the processing unit, particular information about the user in the first signal; and
        transmitting, by a transmitter within the sensing device, the first signal that encodes the particular information about the user to the input device by direct contact so that the particular information serves to authenticate the user on the input device for the intended operation, wherein the particular information includes user-specific display information for the input device that is transmitted prior to the user being authenticated, and wherein an attribute at a touch-device sensor is greater than a threshold and attributes at one or more other touch-device sensors are lower than the threshold, wherein the attributes reflect that the first signal is being transmitted while the sensing device is in direct contact with the input device.

2. The method of claim 1, wherein the input device is a touch device.

3. The method of claim 2, wherein the first signal is transmitted to the input device in response to the user initiating a touch event between the sensing device and the touch device.

4. The method of claim 2, further comprising:
    while a second user is using the sensing device to interact with the touch device, performing the steps of:
        using the one or more sensors, to detect biometric information of the second user;
        converting, by the processing unit, the biometric information of the second user into a third signal that encodes particular information about the second user; and
        transmitting the third signal, by the transmitter, to the touch device.

5. The method of claim 1, wherein the sensing device is a handheld device.

6. The method of claim 1, wherein the step of transmitting the first signal comprises transmitting authentication information about the user to the input device.

7. The method of claim 1, further comprising transmitting a second signal wirelessly, by a second transmitter within the sensing device, to the input device, wherein the second signal is an encoded signal that is decoded using the first signal transmitted to the input device.

8. The method of claim 1, wherein the step of converting the biometric information of the user into a first signal further comprises embedding sensing device specific information into the first signal.

9. The method of claim 8, wherein the sensing device specific information is configured information related to how the first signal is interpreted.

10. The method of claim 1, wherein the direct contact of the first signal causes a plurality of changes in measured capacitance at the input device.

11. The method of claim 1, further comprising:
    generating an error message, when the user is not authenticated for performing the intended operation.

12. A method comprising:
    receiving, by a set of one or more sensors operatively coupled to an input device, a signal transmitted by direct contact via a sensor device that is being used by a user to create an interaction event on the input device for an intended operation, wherein the signal:
        encodes particular information about the user so that the particular information serves to authenticate the user on the input device for the intended operation, wherein the particular information includes user-specific display information for the input device that is transmitted prior to the user being authenticated, and wherein the particular information is encoded in the signal by a processing unit included in the input device; and is derived by the sensor device from biometric information sensed, by the sensor device, from the user; and decoding the signal on the input device to determine both a location of the interaction event and the particular information about the user, wherein an attribute at a touch-device sensor corresponding to the location is greater than a threshold and attributes at one or more other touch-device sensors are lower than the threshold, wherein the attributes reflect that the signal is being transmitted while the sensing device is in direct contact with the input device.

13. The method of claim 12, further comprising, within the input device, determining the user's identity based upon the particular information about the user.

14. The method of claim 13, further comprising: based on the user's identity that was determined based on the particular information about the user, displaying user-specific information, on a display associated with the input device.

15. The method of claim 14 wherein displaying the user-specific information is performed only for a period of time that is based on the duration of the interaction event.

16. The method of claim 12, wherein the input device is a touch device.

17. The method of claim 16, wherein the interaction event is a touch event that identifies a particular operation on the touch device; and further comprising:

based on the user's identity, determining whether to perform the particular operation identified by the touch event.

18. The method of claim 12, wherein the particular information about the user includes a timestamp related to how long the particular information about the user is valid for determining the user's identity.

19. The method of claim 12, wherein the particular information about the user includes sensor device specific information related to a particular label associated with the interaction event and is displayed with the particular label on a display associated with the input device.

20. The method of claim 12, further comprising:

receiving, by the set of one or more sensors, a second signal transmitted from the sensor device that is being used by a second user to create a second interaction event on the input device, wherein the second signal encodes particular information about the second user that is based on biometric information sensed, by the sensor device, from the second user;

decoding the second signal on the input device to determine both a location of the second interaction event and the particular information about the second user; and tracking interaction events associated with the user and the second user based upon particular information decoded from the signal and the second signal from the interaction events.

21. A sensing device for transmitting information about a user to an input device comprising:

one or more sensors, within the sensing device, configured to detect biometric information of the user, while the user is using the sensing device to interact with the input device for an intended operation;

a processing unit, within the sensing device, configured to convert the biometric information of the user into a first signal, and encode particular information about the user in the first signal; and a transmitter, within the sensing device, configured to transmit the first signal that encodes the particular information about the user to the input device by direct contact so that the particular information serves to authenticate the user on the input device for the intended operation, wherein the particular information includes user-specific display information for the input device that is transmitted prior to the user being authenticated, and wherein an attribute at a touch-device sensor is greater than a threshold and attributes at one or more other touch-device sensors are lower than the threshold, wherein the attributes reflect that the first signal is being transmitted while the sensing device is in direct contact with the input device.

22. The sensing device of claim 21, wherein the input device is a touch device.

23. The sensing device of claim 22, wherein the first signal is transmitted to the sensing device in response to the user initiating a touch event between the sensing device and the touch device.

24. The sensing device of claim 21, wherein the sensing device is a handheld device.

25. The sensing device of claim 21, further comprising a second transmitter configured to transmit wirelessly a second signal, wherein the second signal is an encoded signal that is decoded using the first signal transmitted to the input device.

26. The sensing device of claim 21, wherein the processing unit is further configured to generate an error message, when the user is not authenticated for performing the intended operation.

* * * * *